US012486055B2

(12) United States Patent
Mengotti

(10) Patent No.: US 12,486,055 B2
(45) Date of Patent: Dec. 2, 2025

(54) SERIES OF CONVERTIBLE AIRCRAFTS CAPABLE OF HOVERING AND METHOD FOR CONFIGURING A CONVERTIBLE AIRCRAFT CAPABLE OF HOVERING

(71) Applicant: LEONARDO S.P.A., Rome (IT)

(72) Inventor: Riccardo Bianco Mengotti, Samarate (IT)

(73) Assignee: LEONARDO S.P.A., Rome (IT)

( * ) Notice: Subject to any disclaimer, the term of this patent is extended or adjusted under 35 U.S.C. 154(b) by 61 days.

(21) Appl. No.: 18/568,374

(22) PCT Filed: May 24, 2022

(86) PCT No.: PCT/IB2022/054832
§ 371 (c)(1),
(2) Date: Dec. 8, 2023

(87) PCT Pub. No.: WO2022/263948
PCT Pub. Date: Dec. 22, 2022

(65) Prior Publication Data
US 2025/0083825 A1 Mar. 13, 2025

(30) Foreign Application Priority Data
Jun. 18, 2021 (EP) .................................... 21180404

(51) Int. Cl.
*B64U 10/16* (2023.01)
*B64C 29/00* (2006.01)
(Continued)

(52) U.S. Cl.
CPC .......... *B64U 30/10* (2023.01); *B64C 29/0033* (2013.01); *B64D 27/33* (2024.01);
(Continued)

(58) Field of Classification Search
CPC ........ B64U 10/16; B64U 50/19; B64U 30/14; B64C 29/0033; B64C 39/12; B64D 27/33; B64D 31/18; B64D 31/09
See application file for complete search history.

(56) References Cited

U.S. PATENT DOCUMENTS 10,011,349 B2 7/2018 Ivans et al.
10,994,859 B2 * 5/2021 Zarate .................. B64D 37/005
(Continued)

FOREIGN PATENT DOCUMENTS

EP 3597528 1/2020

OTHER PUBLICATIONS

Extended European Search Report in EP Application No. 21180404. 2-1010, mailed Dec. 15, 2021 (11 pages).
(Continued)

*Primary Examiner* — Philip J Bonzell
(74) *Attorney, Agent, or Firm* — Leason Ellis LLP

(57) ABSTRACT

A series of convertible aircrafts with a core with an airframe defining a first axis is described; a first, a second, a third, a fourth, a fifth and a sixth rotor which are rotatable about respective first, second, third, fourth, fifth and sixth axis, and operable independently of each other so as to generate respectively a first, a second, a third, a fourth, a fifth and a sixth thrust value independent of each other; the core comprises an electric power source and electric motors which are connected to said first, second, third, fourth, fifth and sixth rotor; each aircraft of the series comprises a module associated with a respective architecture and interfaced with said core.

6 Claims, 10 Drawing Sheets

(51) Int. Cl.
    *B64D 27/33*         (2024.01)
    *B64D 31/09*         (2024.01)
    *B64U 10/25*         (2023.01)
    *B64U 30/10*         (2023.01)
    *B64U 30/20*         (2023.01)
    *B64U 50/13*         (2023.01)
    *B64U 50/19*         (2023.01)

(52) U.S. Cl.
    CPC ............ *B64D 31/09* (2024.01); *B64U 10/16* (2023.01); *B64U 10/25* (2023.01); *B64U 30/20* (2023.01); *B64U 50/13* (2023.01); *B64U 50/19* (2023.01)

(56) References Cited

U.S. PATENT DOCUMENTS

| | | | | |
|---|---|---|---|---|
| 11,273,911 | B2 * | 3/2022 | Brand | B64D 27/31 |
| 11,447,035 | B1 * | 9/2022 | Hull | H02J 7/0029 |
| 11,447,246 | B2 * | 9/2022 | Kunz | B64C 39/04 |
| 11,807,357 | B2 * | 11/2023 | Groninga | B64C 29/0025 |
| 2011/0315809 | A1 * | 12/2011 | Oliver | B64C 39/08 244/12.4 |
| 2016/0207625 | A1 | 7/2016 | Judas et al. | |
| 2018/0354615 | A1 | 12/2018 | Groninga et al. | |
| 2019/0144108 | A1 | 5/2019 | Mccullough et al. | |
| 2019/0233107 | A1 | 8/2019 | Tian | |
| 2020/0164972 | A1 | 5/2020 | Kiesewetter et al. | |
| 2020/0361601 | A1 | 11/2020 | Mikic et al. | |
| 2021/0016889 | A1 * | 1/2021 | Zarate | B64D 37/005 |
| 2021/0053676 | A1 * | 2/2021 | Brand | B64D 27/31 |
| 2021/0197965 | A1 * | 7/2021 | Kunz | B64U 30/14 |
| 2022/0306293 | A1 * | 9/2022 | Groninga | B64C 29/0025 |
| 2024/0270415 | A1 * | 8/2024 | Bianco Mengotti | B64U 50/19 |

OTHER PUBLICATIONS

International Search Report and Written Opinion in PCT Application No. PCT/IB2022/054832, mailed Aug. 16, 2022 (14 pages).

* cited by examiner

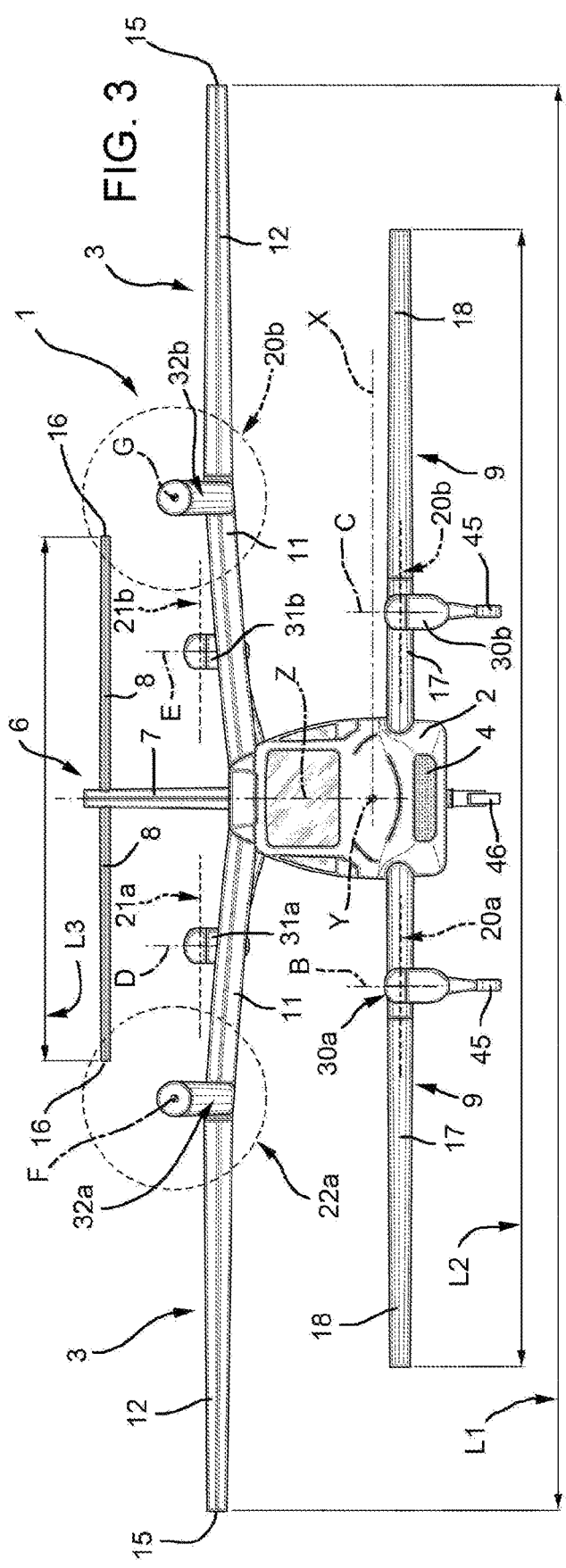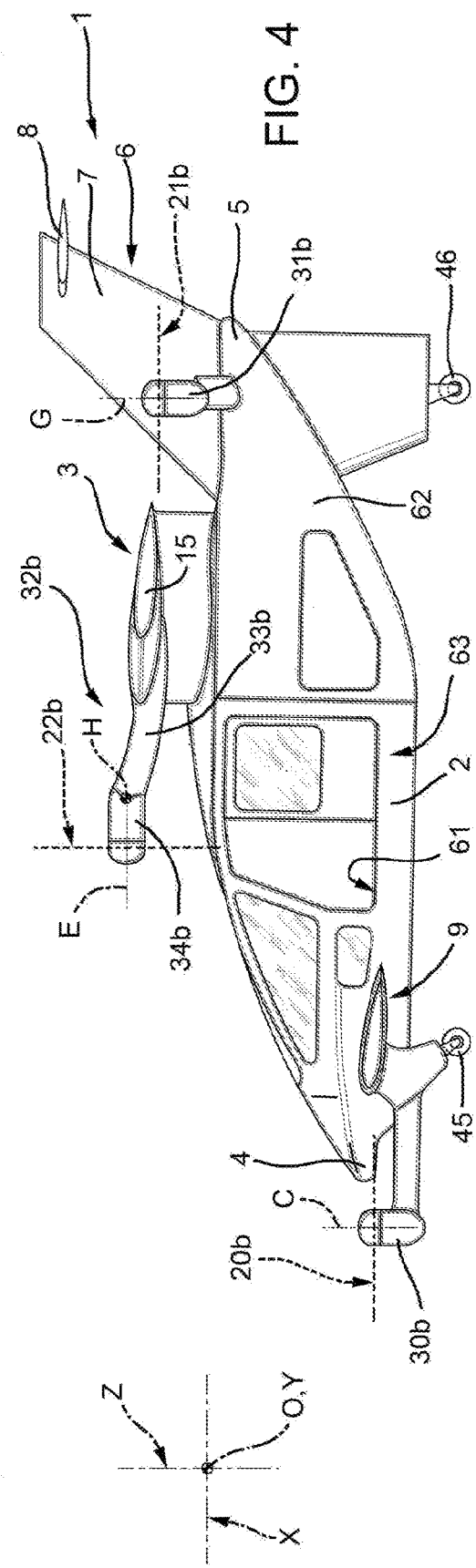

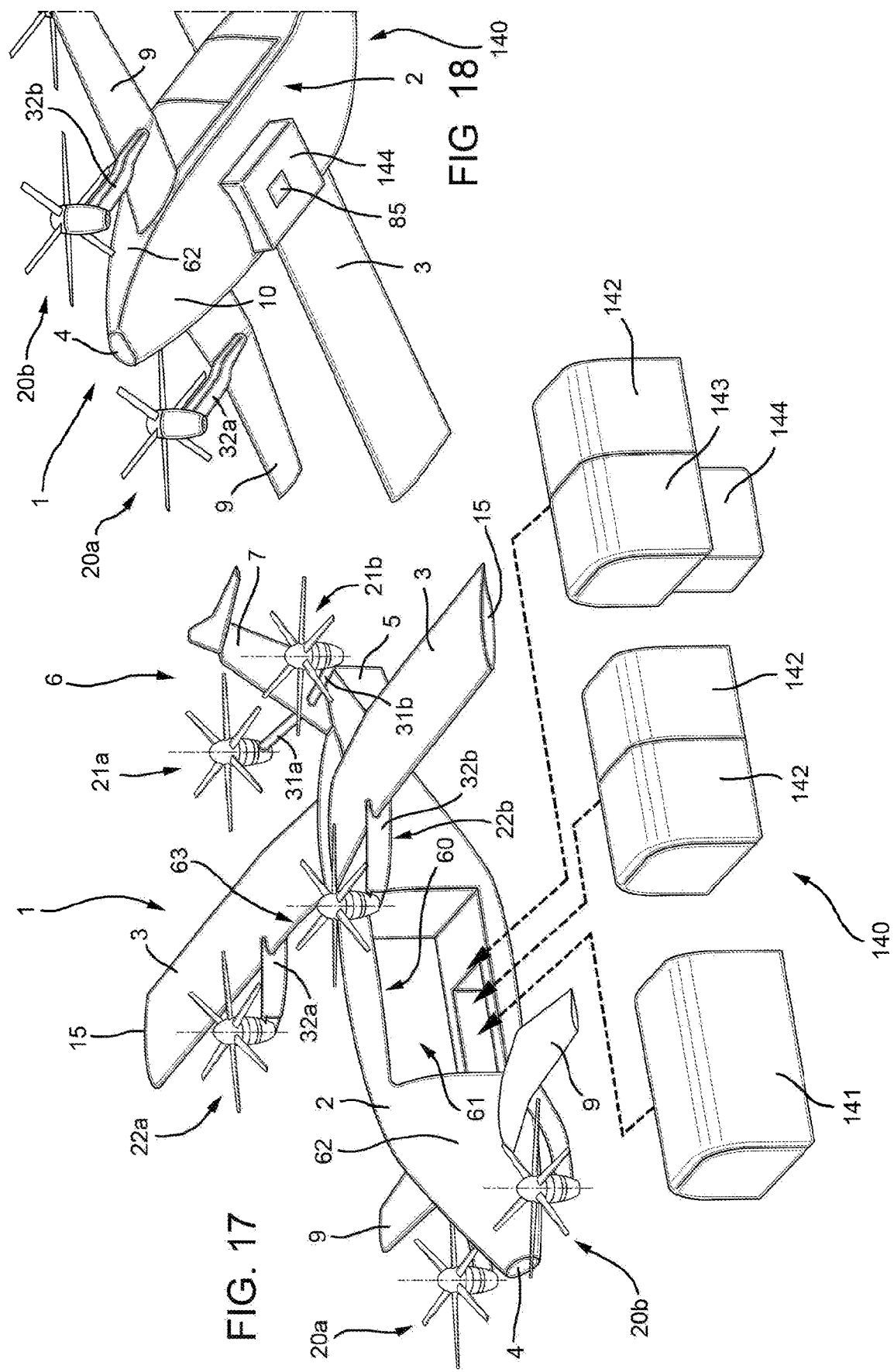

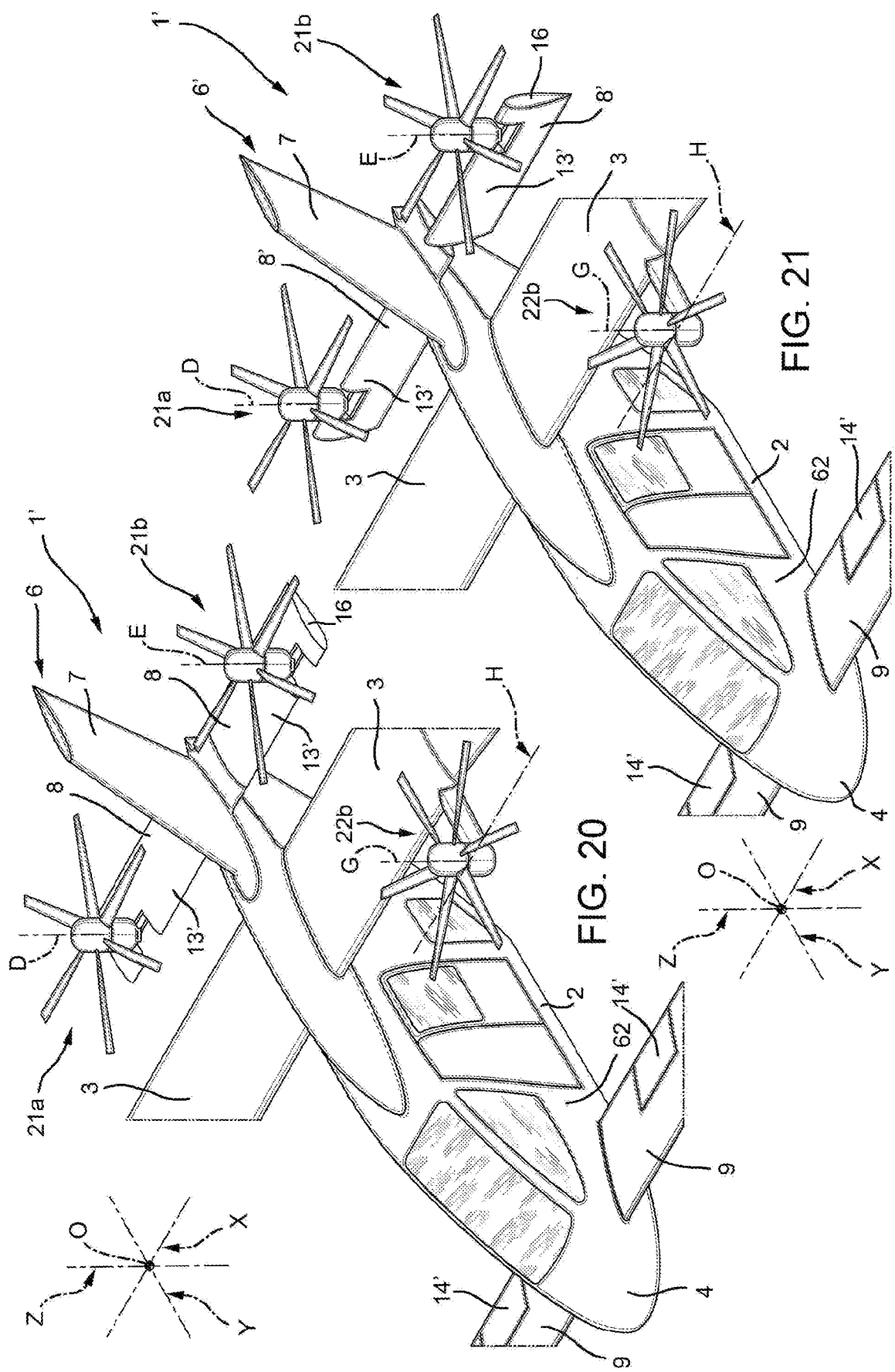

SERIES OF CONVERTIBLE AIRCRAFTS CAPABLE OF HOVERING AND METHOD FOR CONFIGURING A CONVERTIBLE AIRCRAFT CAPABLE OF HOVERING

CROSS-REFERENCE TO RELATED APPLICATIONS

This Patent Application a U.S. National Phase Application under 35 U.S.C. § 371 of International Patent Application No. PCT/IB2022/054832, filed on May 24, 2022, which claims priority from Italian Patent Application No. 21180404.2, filed on Jun. 18, 2021, all of which are incorporated by reference, as if expressly set forth in their respective entireties herein.

TECHNICAL FIELD OF THE INVENTION

The present invention relates to a series of aircrafts that are convertible between a first configuration of hovering flight or of flight along a predominantly vertical trajectory and a second forward flight or cruise configuration.

The present invention also relates to a method for configuring a convertible aircraft.

STATE OF THE ART

In the aviation sector, aeroplanes are normally used for high cruising speeds, in particular greater than 150 knots and high altitudes, e.g. above 30,000 feet. At cruising speeds and high altitudes, aeroplanes use fixed wings to generate the lift necessary to sustain the plane. A sufficient value of this lift can only be obtained by accelerating the aeroplane on runways of considerable length. These runways are also necessary to allow the same aeroplanes to land.

In contrast, helicopters normally have lower cruising speeds than aeroplanes and generate the necessary lift for sustenance through the rotation of the main rotor blades. As a result, helicopters can land/take off without the need for a horizontal speed and using particularly small surfaces. Moreover, helicopters are able to hover and to fly at relatively low altitudes and speeds, resulting thus as particularly manoeuvrable and suitable for demanding manoeuvres such as rescuing people in the mountains or at sea.

Nevertheless, helicopters have inherent limitations in terms of maximum operational altitude, which is around 20000 feet, and maximum operational speed, which cannot exceed 150 knots.

In order to meet the demand for aircrafts that have the same manoeuvrability and flexibility of use as the helicopter and at the same time overcome the inherent limitations mentioned above, convertiplanes are known and which constitute a type of convertible aircraft.

An example of a convertiplane is described in U.S. Pat. No. 10,011,349.

In more detail, the convertiplane described in the aforesaid application essentially comprises:
  a fuselage extending along a first longitudinal axis; and
  a pair of half-wings projecting cantilevered from respective parts of the fuselage that are opposite to each other, and having respective free ends opposite to the fuselage and aligned along a second transverse axis that is substantially orthogonal to the first longitudinal axis.

The convertiplane further comprises:
  a pair of nacelles housing the respective motors; and
  a pair of rotors that are rotatable around respective third axes and operatively connected to respective motors.

The rotors can be inclined relative to the wing around a fourth axis, preferably parallel to the second axis.

The convertiplanes are also able to selectively assume:
  the first "helicopter" configuration, wherein the rotors are arranged with the respective third axes that are substantially vertical and orthogonal to the first axis of the convertiplane and orthogonal to the respective motors; or
  the second "aeroplane" configuration, wherein the rotors are arranged with respective third axes that are substantially parallel to the first axis of the same convertiplane and coaxial to the respective engines.

Recently, several proposals for convertible aircrafts with electric propulsion have been developed.

Among them, patent application WO-A-2020/105045 describes a convertible aircraft comprising essentially:
  an airframe elongated according to a longitudinal direction of the aircraft;
  a pair of half-wings projecting cantilevered from respective sides of the airframe; and
  a portion of the tail formed by two aerodynamic surfaces forming a V.

The aircraft described in WO-A-2020/105045 further comprises:
  two pairs of first rotors with axis fixed with respect to the airframe and which are arranged so as to form a polygon surrounding the centre of gravity of the aircraft;
  two pairs of second rotors with tilting axis with respect to the airframe.

In more detail, the first rotors and second rotors are controllable independently of each other so as to provide respective first and second thrusts that can be adjusted independently of each other.

A pair of second rotors is arranged at free ends of respective half-wings while the other pair of second rotors is arranged at free ends of respective aerodynamic surfaces of the tail portion.

The second rotors are inclinable between a first position wherein the respective second axes are arranged orthogonal to the longitudinal direction of the aircraft and provide a vertical thrust, and a second position wherein respective second axes are arranged parallel to the longitudinal direction of the aircraft and provide a thrust parallel to the forward direction of the aircraft.

Consequently, the aircraft can selectively assume:
  the first configuration, wherein the second rotors are arranged in the first position and cooperate with the first rotors to provide the vertical thrust necessary to sustain the aircraft; and
  the second configuration, wherein the second rotors are arranged in the second position and provide the horizontal thrust necessary to move the aircraft forward, while the first rotors and half-wings provide the vertical thrust necessary to sustain the aircraft.

The need is felt in the sector to realize a convertible aircraft capable of being reconfigured simply and with as few operations as possible, so as to be able to carry out long distance missions or to be able to reduce consumption or to be able to achieve high performance flight.

US-A-2020/361601, US-A-2019/233107, US-A-2019/144108 and EP-A-3597528 disclose a series of convertible aircraft according to the preamble of claim 1 and a method for configuring a convertible aircraft according to the preamble of claim 6.

SUBJECT AND SUMMARY OF THE INVENTION

Aim of the present invention is to realize a series of convertible aircraft which allows to satisfy at least one of the needs specified above in a simple and economical way.

According to the invention, this aim is achieved by a series of convertible aircraft as claimed in claim 1.

The present invention also relates to a method for configuring a convertible aircraft as claimed in claim 6.

BRIEF DESCRIPTION OF THE DRAWINGS

For a better understanding of the present invention, two preferred non-limiting embodiments are described below, purely by way of example and with the aid of the attached drawings, wherein:

FIG. 3 is a front view of the aircraft of FIGS. 1 and 2 arranged in the second configuration;

FIG. 4 is a side view of the aircraft of FIGS. 1 to 3 arranged in the second configuration;

FIG. 10 shows in perspective view some components of the first architecture of the aircraft in FIG. 9, with parts removed for clarity's sake;

FIG. 14 shows in perspective view some components of the second and third architecture of the aircraft in FIG. 9, with parts removed for clarity's sake;

FIG. 17 shows in perspective view in partially exploded enlarged scale and according to a first viewing angle the fourth architecture of FIG. 16;

FIG. 18 shows in perspective view one with a second viewing angle the fourth architecture of FIGS. 16 and 17;

FIG. 20 is a perspective view of a second embodiment of a convertible aircraft of the series made according to the dictates of the present invention arranged in the first configuration; and FIG. 21 is a perspective view of the aircraft in FIG. 20 arranged in the second configuration.

DETAILED DESCRIPTION OF PREFERRED EMBODIMENTS OF THE INVENTION

Figure 1:
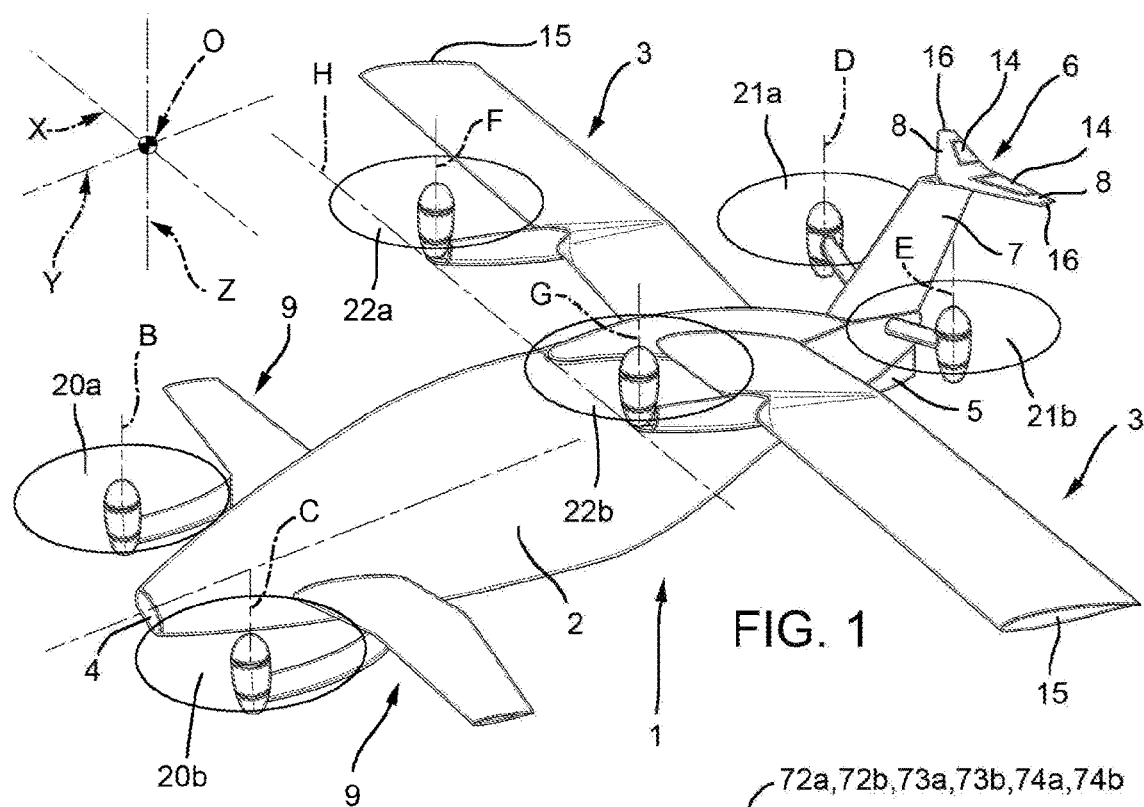
FIG. 1 is a perspective view of a first embodiment of a convertible aircraft of the series made according to the dictates of the present invention arranged in a first configuration.

With reference to FIGS. 1 to 19, 1 denotes an aircraft capable of hovering.

In more detail, the aircraft 1 is selectively switchable between:

a first configuration (FIG. 1), wherein it performs a hovering manoeuvre or moves forward along a predominantly vertical trajectory; and a second configuration (FIG. 2), wherein it is in a forward flight condition and proceeds along a mainly horizontal trajectory.

It must be specified that in the following present disclosure, expressions such as "upper", "lower", "at the front", "at the back" and the like are used referring to forward flight conditions or "hovering" of the convertiplane 1 shown in FIGS. 1 to 2.

It is possible to identify a triplet of axes integral to the aircraft 1 and originating at a centre of gravity O of the aircraft 1 itself formed by:

a longitudinal axis Y of the same aircraft 1;

an axis X orthogonal to the axis Y; and an axis Z orthogonal to the axes X, Y.

In a known manner, the rotations of the aircraft 1 around the axes Y, X, Z are associated with the following manoeuvres:

roll, i.e. rotation about the axis Y (FIGS. 6b and 6f);

pitch, i.e. rotation about the axis X (FIGS. 6c and 6g);

yaw, i.e. rotation about the axis Z (FIGS. 6d and 6h).

The aircraft 1 essentially comprises:

an airframe 2 which is elongated along the axis Y and defining a nose 4 and a tail 5 of the aircraft 1;

a pair of half-wings 3 extending cantilevered from respective mutually opposite sidewalls 62 of the airframe 2 and transversely to the axis Y; and a tail portion 6 projecting cantilevered from the tail 5 of the airframe 2 transversely to the airframe 2.

With reference to normal forward flight operating conditions, the aircraft 1 proceeds in a direction that is oriented from tail 5 to nose 4.

The half-wings 3 are intended to provide a first lift value to the aircraft 1 which is adapted to sustain the aircraft 1 arranged in the second configuration.

The half-wings 3 comprise respective free ends 15 opposite the airframe 2.

The half-wings 3 extend superiorly to the airframe 2.

In the case shown, the semi-axes 3 comprise:

respective root portions 11 projecting cantilevered from respective sidewalls 62 of the airframe 2, and diverging from each other proceeding from the airframe 2 towards respective free ends 15; and respective end portions 12 arranged superiorly to the airframe 2, defining the respective ends 15 and substantially parallel to each other.

The tail portion 6 is preferably T-shaped and comprises, in turn:

a fin 7 intended to provide lateral stability to the aircraft 1 arranged in the second configuration; and a cup of aerodynamic surfaces 8 projecting cantilevered from respective mutually opposite sides of the fin 7, comprising respective free ends 16, and adapted to generate a second lift/downforce value to ensure a desired degree of longitudinal stability to the aircraft 1 itself arranged in the second configuration.

Preferably, the aircraft 1 further comprises a pair of canard-type aerodynamic surfaces 9 projecting cantilevered from respective mutually opposite sides of the nose 4 of the airframe 2 and adapted to generate a third lift/downforce value to ensure the desired degree of longitudinal stability to the aircraft 1 itself arranged in the second configuration.

The aerodynamic surfaces 9 comprise, in turn:
respective root portions 17 projecting cantilevered from and connected to respective sidewalls 62 of the airframe 2; and
respective end portions 18 arranged on the opposite side of the corresponding root portions 17 with respect to the airframe 2.

In particular, the root 17 and end 18 portions are coplanar with each other.

In the case shown, the wingspan L1 of the half-wings 3 is greater than the wingspan L2 of the aerodynamic surfaces 8.

The wingspan L2 of the aerodynamic surfaces 9 is greater than the wingspan L3 of the aerodynamic surfaces 8.

In the case shown in FIG. 3, the wingspan of the aerodynamic surfaces 8 ranges between 40 and 50% of the wingspan of the aerodynamic surfaces 9.

The wingspan of the aerodynamic surfaces 9 ranges between 70 and 90% of the wingspan of the half-wings 3.

In this description, the term "wingspan" means the distance between opposite free ends 17, 18 of the respective half-wings 3 and aerodynamic surfaces 8, 9.

The aerodynamic surfaces 9 are arranged inferiorly to the half-wings 3. The half-wings 3 are arranged inferiorly to the aerodynamic surfaces 8.

In the shown case, the aerodynamic surfaces 8 comprise respective appendages 14 which are movably connected thereto to adjust the second lift value and to contribute to the control of the aircraft 1.

The aircraft 1 also comprises:
a pair of rotors 20a, 20b which are rotatable about respective fixed axes B, C with respect to the airframe 2;
a pair of rotors 21a, 21b which are rotatable about respective fixed axes D, E with respect to the airframe 2; and
a pair of rotors 22a, 22b which are rotatable about respective axes F, G and inclinable with respect to an axis H between a first position assumed when the aircraft 1 is in the first configuration and a second position assumed when the aircraft 1 is in the second configuration.

In the shown case, the axes F, G of the rotors 22a, 22b are inclinable with respect to the axis H by more or less fifteen degrees towards the nose 4 or the tail 5 with respect to the axis Z.

The aircraft 1 further comprises a control unit 71 (FIGS. 11 and 15) receiving at input a plurality of control signals provided by the crew, an autopilot or a remote control system, and programmed to provide as output a plurality of commands to command the rotors 20a, 20b; 21a, 21b; 22a, 22b so that they provide desired values of the relative thrusts T1, T2; T3, T4; T5, T6 (FIGS. 6a to 6h).

In more detail, the control unit 71 is programmed to command the rotors 20a, 20b; 21a, 21b; 22a, 22b to generate respective independent thrusts T1, T2; T3, T4; T5, T6.

More particularly, the control unit 71 is programmed to command the rotors 20a, 20b; 21a, 21b; to generate respective thrusts T1, T2 (T3, T4) having a resultant which is parallel to the axis Z, either when the aircraft 1 is in the first configuration or when the aircraft 1 is in the second configuration.

The control unit 71 is programmed to command the rotors 20a, 20b; 21a, 21b to generate respective zero thrusts T1, T2; T3, T4 under predetermined operating conditions and when the aircraft 1 is in the first configuration.

The axes B, C; D, E and F, G are arranged symmetrically to the axis Y.

In the case shown, the axes B, C, D and E are parallel to each other and parallel to the axis Z.

The axes B, D, F; C, E, G are aligned with each other parallel to the axis Y when the aircraft 1 is arranged in the first configuration.

The axis H is parallel to the axis X.

The axes F, G are arranged parallel to the axis Z when the rotors 22a, 22b are arranged in the first position.

The axes F, G are arranged orthogonally to the axes B, C; D, E and parallel to the axis Y when the rotors 22a, 22b are arranged in the second position.

The thrusts T1, T2; T3, T4 have a main component which is parallel to the respective axes B, C; D, E and is parallel to the axis Z either when the aircraft 1 is arranged in the first configuration or when the aircraft 1 is arranged in the second configuration.

The thrusts T5, T6 have a main component which is parallel to the axes B, C; D, E and the axis Z when the aircraft 1 is arranged in the first configuration and a main component to the axis Y when the aircraft 1 is arranged in the second configuration.

In one embodiment, the rotors 20a, 20b; 21a, 21b; 22a, 22b are with fixed pitch.

Preferably, the rotors 20a, 20b; 21a, 21b; 22a, 22c are driven by respective electric motors.

The aircraft 1 also comprises:
a pair of supports 30a, 30b in order to support respective rotors 20a, 20b in a fixed manner with respect to respective aerodynamic surfaces 9;
a pair of supports 31a, 31b in order to support respective rotors 21a, 21b in a fixed manner with respect to the airframe 2; and
a pair of supports 32a, 32b in order to support respective rotors 22a, 22b to respective half-wings 3 in an inclinable manner with respect to the axis H.

Preferably, the supports 32a, 32b are spaced apart from the ends 15 of the respective half-wings 3, with reference to an extension direction of the same half-wings 3.

More precisely, the supports 32a, 32b are carried by respective root portions 11 of respective half-wings 3.

The supports 30a, 30b are spaced apart from the free ends of the respective aerodynamic surfaces with reference to an extension direction of the same aerodynamic surfaces 9.

In particular, the supports 30a, 30b are conformed as respective rods projecting cantilevered below from respective aerodynamic surfaces 9 anteriorly to the nose 4.

In the shown case, the supports 30a, 30b are fixed to respective root portions 17 of corresponding aerodynamic surfaces 9.

The axes B, C are arranged anteriorly to the nose 4.

The supports 31a, 31b are conformed as rods projecting cantilevered from respective sidewalls 62 of the airframe 2 laterally to the fin 7, posteriorly to the respective half-wings 3 and anteriorly to the respective aerodynamic surfaces 8.

The rotors 21a, 21b are arranged laterally to the fin 7 and inferiorly to the respective aerodynamic surfaces 8, and posteriorly to the respective half-wings 3.

The axes D, D, E are arranged anteriorly to the respective aerodynamic surfaces 8.

The supports 32a, 32b comprise:
- respective rods 33a, 33b projecting cantilevered anteriorly in a fixed manner from respective half-wings 3; and
- respective pins 34a, 34b that are rotatable about corresponding rods 33a, 33b parallel to the axis H and supporting respective rotors 22a, 22b about respective axes F, G.

The pins 34a, 34b are interposed between the respective half-wings 3 and the nose 4 along the axis Y.

The rotors 22a, 22b are interposed between the respective half-wings 3 and the nose 4 along the axis Y either when the aircraft 1 is arranged in the first configuration or when the aircraft 1 is arranged in the second configuration.

The rotors 22a, 22b are arranged superiorly to the respective half-wings 3 when the aircraft 1 is arranged in the first configuration, and anteriorly to the respective half-wings 3 when the aircraft 1 is arranged in the second configuration.

The fin 7 extends from both the upper and lower sides of the tail 5 of the airframe 2.

The aircraft 1 also comprises (FIGS. 3 and 4):
- a pair of first carriages 45 carried by respective aerodynamic surfaces 9; and
- a carriage 46 carried by the fin 7 in a position opposite to the aerodynamic surfaces 9.

Preferably, the airframe 2 defines a compartment 60 and a plurality of openings 61 for access to the compartment 60.

The compartment 60 may accommodate crew or passengers, or instrumentation or cargo to be transported, depending on how the aircraft is used 1.

The openings 61 are located at sidewalls 62 of the airframe 3.

The openings 61 are, moreover, arranged in a zone 63 which is delimited along the axis Y between the half-wings 3 and the aerodynamic surfaces 9.

Figure 5:
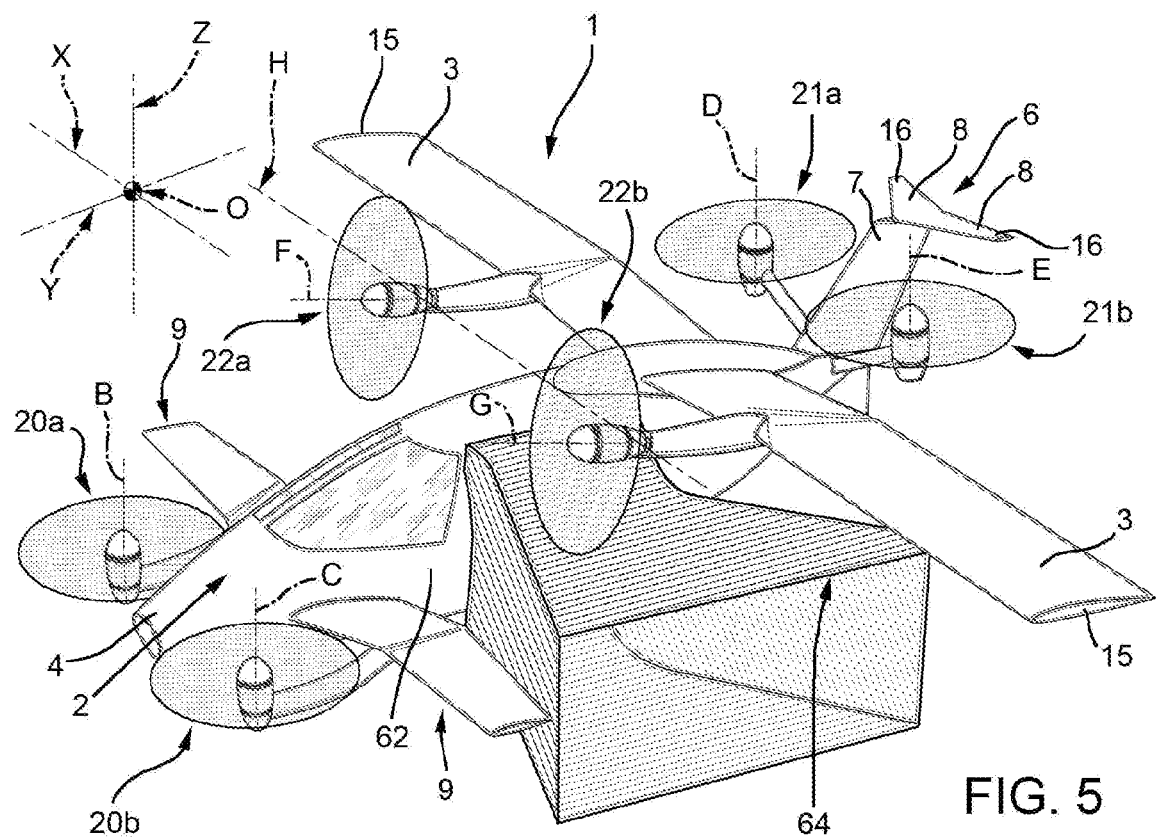
FIG. 5 shows first details of the aircraft of FIGS. 1 to 4.
Figure 16:
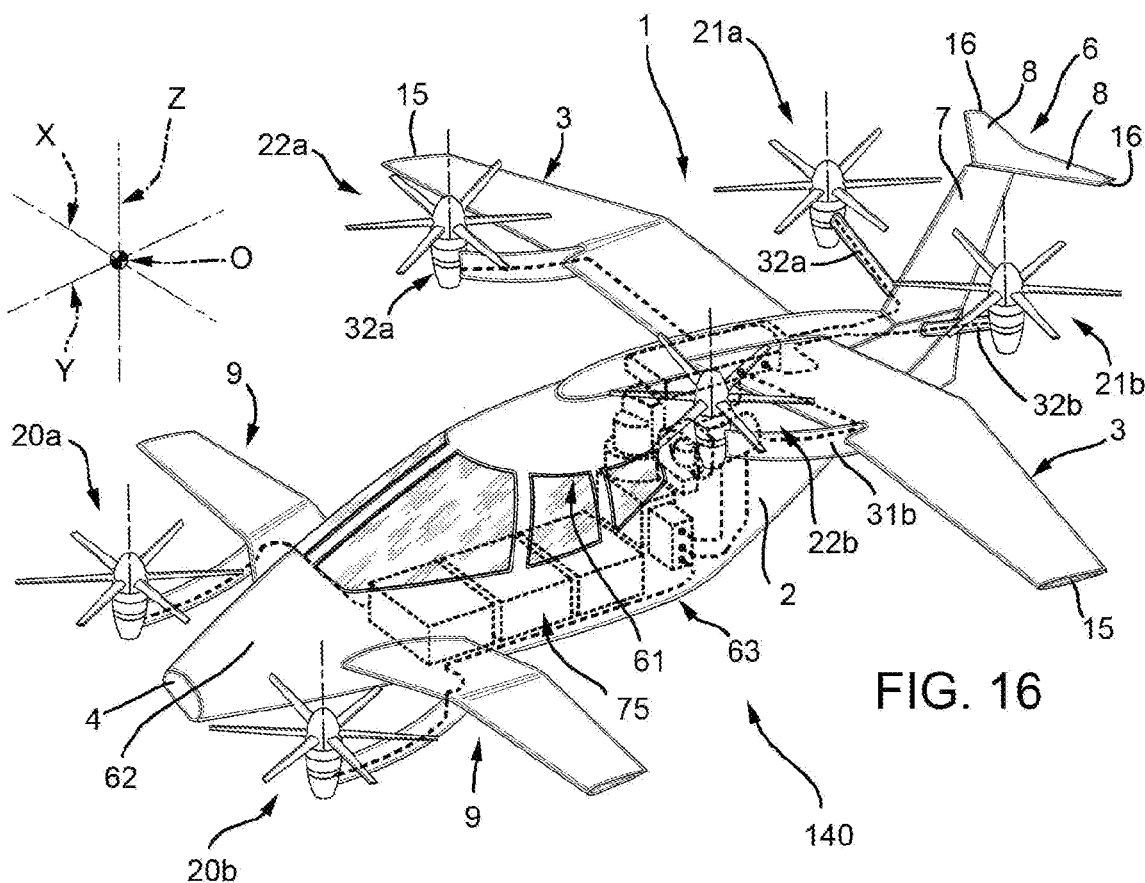
FIG. 16 shows in perspective view some details of the fourth architecture of the aircraft of FIGS. 1 to 8, which is not part of the present invention and is shown only for illustrative purposes.
Figure 6:
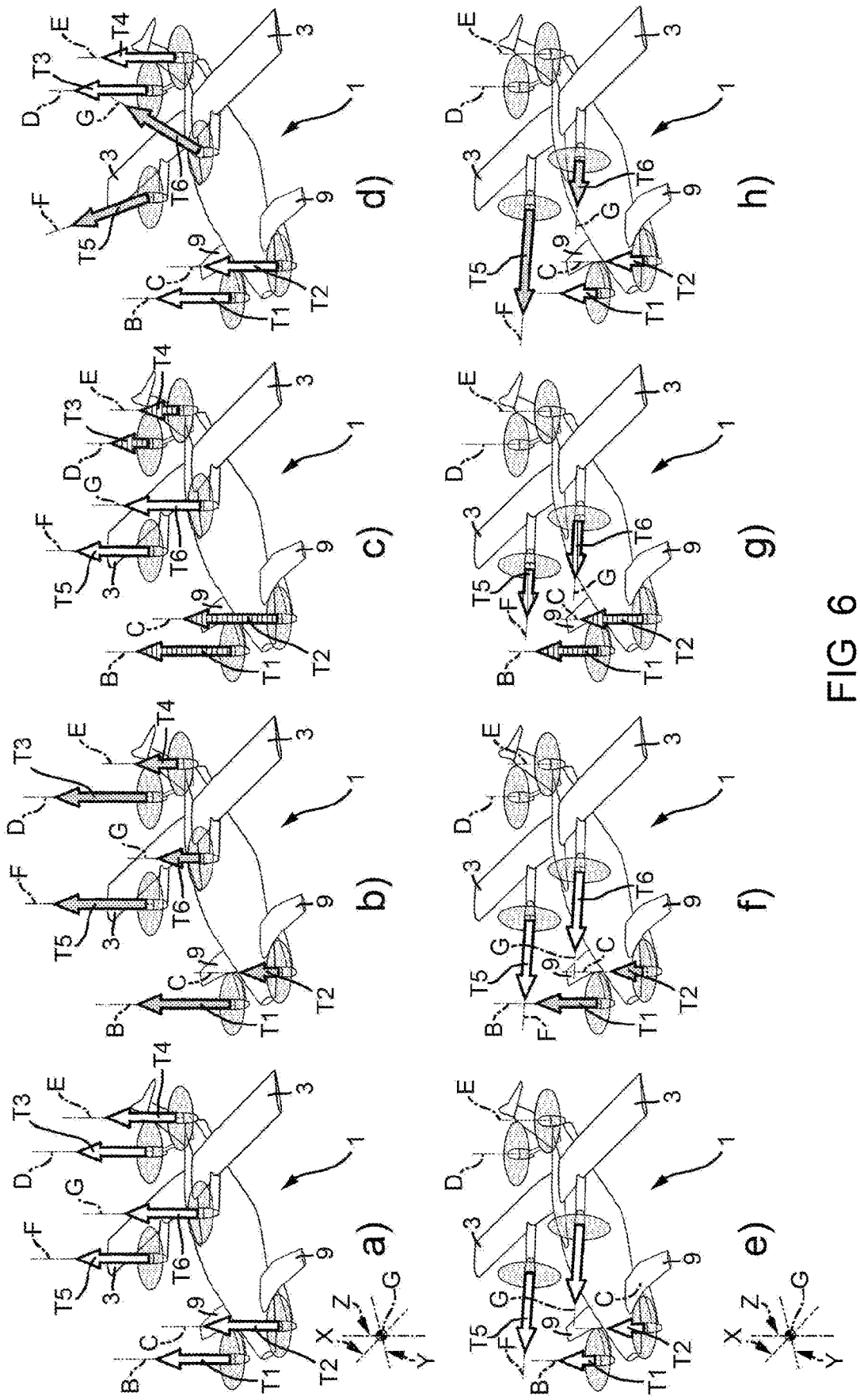
FIGS. 6a to 6h show respective control manoeuvres of the aircraft of FIGS. 1 to 5.
Figure 7:
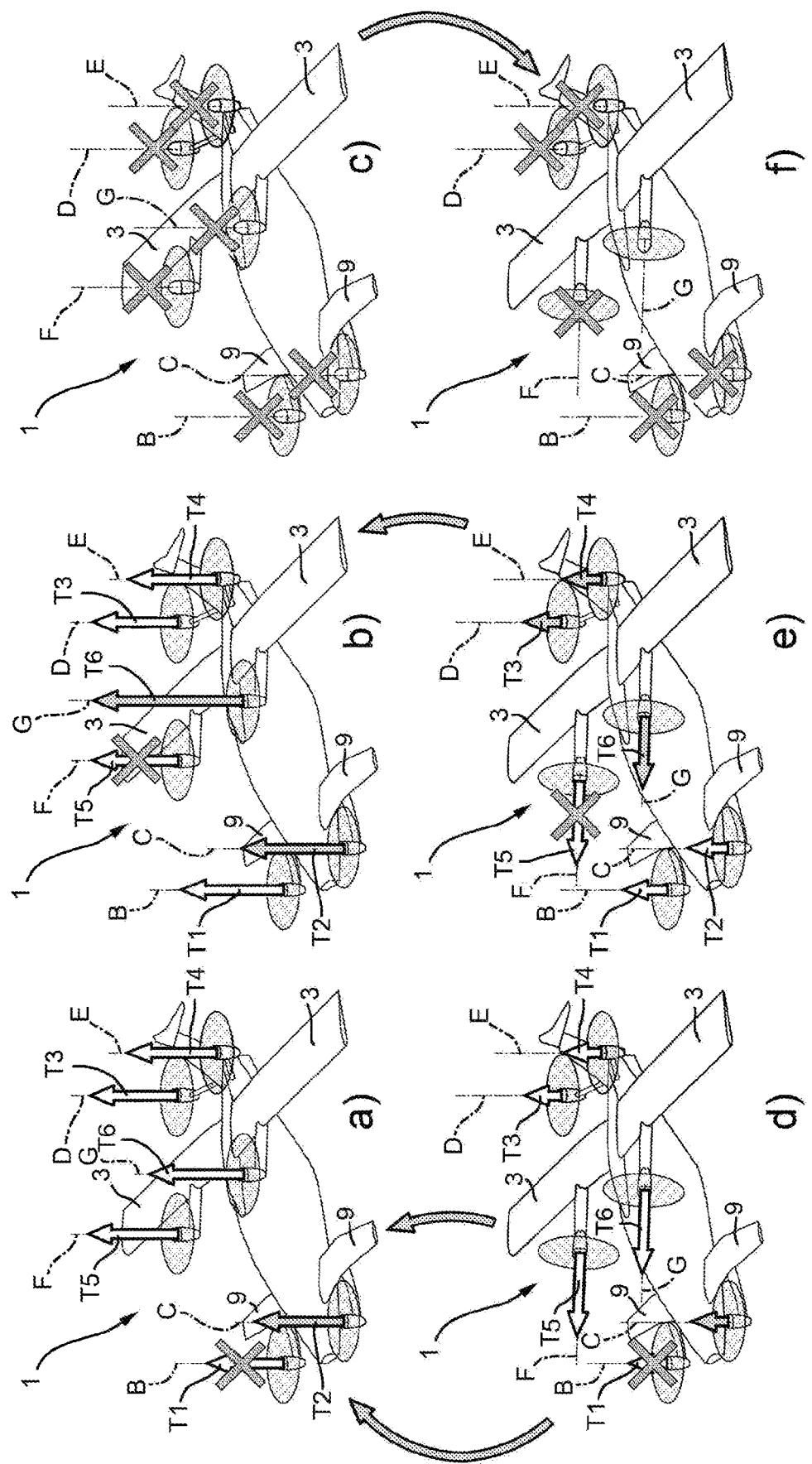
FIGS. 7a to 7f show respective emergency manoeuvres of the aircraft of FIGS. 1 to 5.
Figure 8:
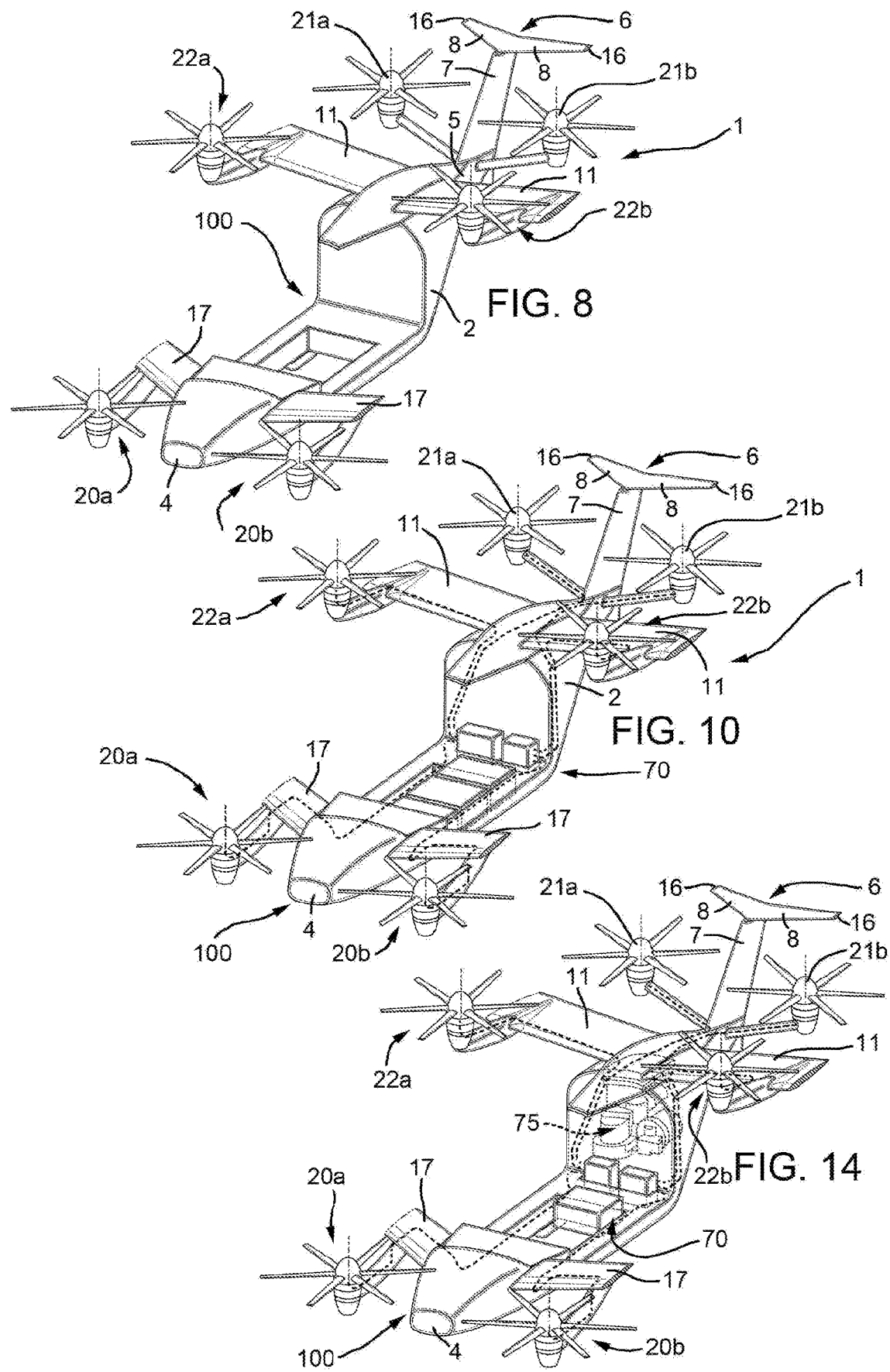
FIG. 8 shows a core which is common to different architectures of the aircraft of FIGS. 1 to 5.

When it is arranged on the ground in the first configuration, the aircraft 1 defines an aisle 64 for access to the opening 61. The aisle 64 is delimited along the axis Y between the half-wings 3 and the aerodynamic surfaces 9 and parallel to the axes B, C between the ground and the supports 32a, 32b of the rotors 22a, 22b arranged in the second position (FIG. 5).

Thanks to the fact that the rotors 20a, 20b are arranged anteriorly to the relevant aerodynamic surfaces 9 and the rotors 22a, 22b are arranged superiorly to the relevant half-wings 3a, 3b, the aisle 64 is clear and easily accessible during boarding/disembarking of passengers and/or loading/unloading of baggage.

With reference to FIGS. 6a-6d and to the first configuration, the aircraft 1 is controlled as follows.

Under steady state conditions, the thrusts T1, T2, T3, T4, T5, T6 allow the aircraft 1 to be sustained with a certain degree of redundancy (FIG. 6a).

In order to perform a roll manoeuvre (FIG. 6b), the control unit 71 is programmed to command the rotors 20a, 20b, 21a, 21b, 22a, 22b so that the thrusts T1, T3, T5 are higher (lower) than the thrusts T2, T4, T6.

For example, the rotors 20a, 20b, 21a, 21b, 22a, 22b are commanded by the control unit 71 so as to increase (decrease) the thrusts T1, T3, T5 and to decrease (increase) the thrusts T2, T4, T6.

This generates three differential thrusts of concordant sign T1-T2; T3-14 and T5-T6 which generate a torque and a consequent rotation of the aircraft around the axis Y.

In order to perform a pitch manoeuvre (FIG. 6c), the control unit 71 is programmed to command the rotors 20a, 20b, 21a, 21b, 22a, 22b so that the thrusts T1, T2 are equal to each other higher than (lower than) the thrusts T3, T4 equal to each other.

For example, the rotors 20a, 20b, 21a, 21b are commanded so as to increase (decrease) the thrusts T1, T2 and to decrease (increase) the thrusts T3, T4.

This generates two differential thrusts of concordant sign T1-T3 and T2-T4 which generate a torque and a consequent rotation of the aircraft around the axis X.

In order to perform a yaw manoeuvre (FIG. 6d), the control unit 71 is programmed to orient the axis F of the rotor 22a towards (opposite side of) the nose 4 and the axis G of the rotor 22b towards (opposite side of) the tail 5.

This generates two components of the thrusts T5, T6 that are parallel to the axis Y and discordant to each other which generate a torque and a consequent rotation of the aircraft around the axis Z.

With reference to FIGS. 6e-6h and to the second configuration, aircraft 1 is controlled as follows.

Under steady state conditions (FIG. 6e), the control unit 71 is programmed to command the rotors 20a, 20b so that the respective thrusts T1, T2 ensure the correct trimming of the aircraft 1—that is, the correct adjustment of the overall lift/downforce value depending on the required speed and weight conditions of the aircraft 1—while and deactivates the rotors T5, T6 so that the thrusts T3, T4 are zero.

In order to perform a roll manoeuvre (FIG. 6f), the control unit 71 is programmed to command the rotors 20a, 20b so that the thrust T1 is higher (lower) than the thrust T2.

For example, the rotors 20a, 20b, are commanded to increase (decrease) thrust T1 and to decrease (increase) thrust T2.

This generates a differential thrust T1-T2 which generates a torque and a consequent rotation of the aircraft around the axis Y.

In order to perform a pitch manoeuvre (FIG. 6g), the control unit 71 is programmed to command the rotors 20a, 20b, 22a, 22b so as to increase (decrease) the thrusts T1, T2 equal to each other and to adjust the thrusts T5, T6 equal to each other.

This generates a torque and a consequent rotation of the aircraft around the axis X.

In order to perform a yaw manoeuvre (FIG. 6h), the control unit 71 commands the rotors 22a, 22b so that the thrust T1 is greater (lower) than the thrust T6.

For example, the rotors 22a, 22b are controlled by the control unit 71 so that the thrust T5 is greater (lower) than the thrust T6.

This generates a torque and a consequent rotation of the aircraft around the axis z.

The control unit 71 is, moreover, programmed to reduce the thrusts T1, T2; T3, T4 of the rotors 20a, 20b; 21a, 21b as the axes F, G of the rotors 22a, 22b progressively approach a condition of parallelism with the axis Y and the speed of the aircraft 1 increases.

The series according to the invention comprises a plurality of aircraft 1 having modular conformation and adapted to be reconfigured according to operational needs so as to each assume a plurality of architectures different from each other.

In more detail, the aircraft 1 can assume:

a first architecture (FIGS. 9 to 11) which is preferably used for urban mobility and passenger transport applications;

a second architecture (FIGS. 12, 14 and 15), wherein it is used as a utility category aircraft;

a third architecture (FIGS. 13, 14 and 15), wherein it is used to transport VIP passengers; or a fourth architecture (FIGS. 16 to 19), wherein it is used as a remote-controlled aircraft.

In more detail, the series comprises a core 100 that is common (FIG. 8) to all aircrafts 1.

Figure 9:
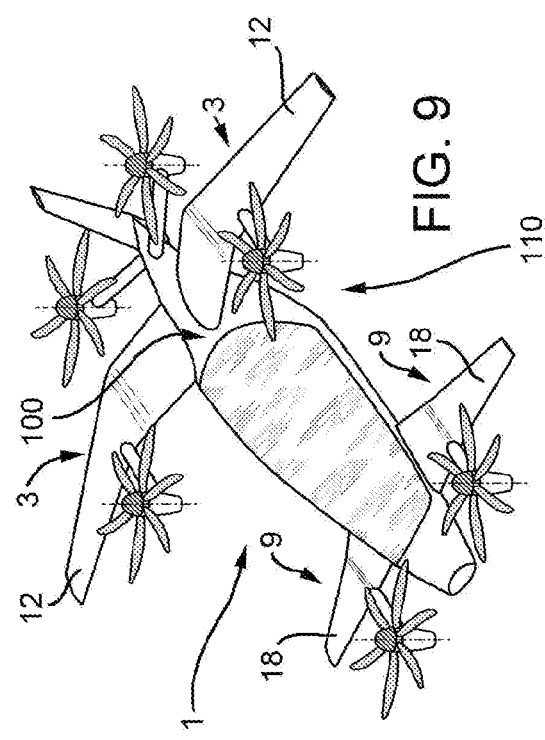
FIG. 9 shows in perspective view a first architecture of the aircraft of FIGS. 1 to 8.

The core 100 comprises, in turn:

the airframe 2, the tail portion 6 and the fin 7 (FIG. 8), and the rotors 20a, 20b; 21a, 21b; 22a, 22b; and an all-electric propulsion system 70 to command the rotors 20a, 20b, 21a, 21b, 22a, 22b independently of each other (FIGS. 9 and 10).

The series comprises a plurality of modules 110; 120, 130; and 140 interfaced with the core 100 to realize the first, second, third and fourth aircraft architecture 1, respectively, and the system 70 comprises, in greater detail (FIG. 11):

the control unit 71 adapted to receive the control signals of the aircraft 1 as input;

a plurality of electric motors 72a, 72b, 73a, 73b, 74a, 74b commanded by the control unit 71 and adapted to command respective rotors 20a, 20b, 21a, 21b, 22a, 22b so that they generate respective thrusts T1, T2, T3, T4, T5, T6; and a plurality of electric batteries 81, which electrically power the electric motors 72a, 72b, 73a, 73b, 74a, 74b.

Preferably, the core 100 comprises the root portions 11, 17 of the half-wings 3 and the aerodynamic surfaces 9, respectively.

With reference to FIG. 9, the module 110 provides the aircraft 1 with the first architecture, which is not part of the present invention and is shown only for illustrative purposes.

The module 110 defines the compartment 60, which forms a compartment for the passengers and relative baggage. The compartment 60 is accessible through the air 64 for the operations of passenger boarding/disembarking and baggage loading/unloading.

Figure 11:
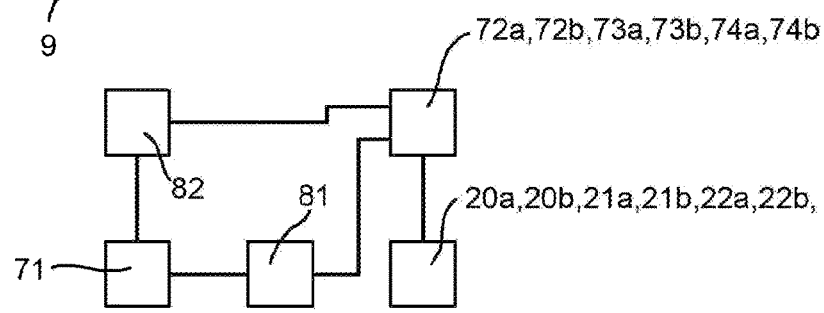
FIG. 11 schematically shows a propulsion system implemented in the first architecture in FIGS. 9 and 10, which is not part of the present invention and is shown only for illustrative purposes.
Figure 15:
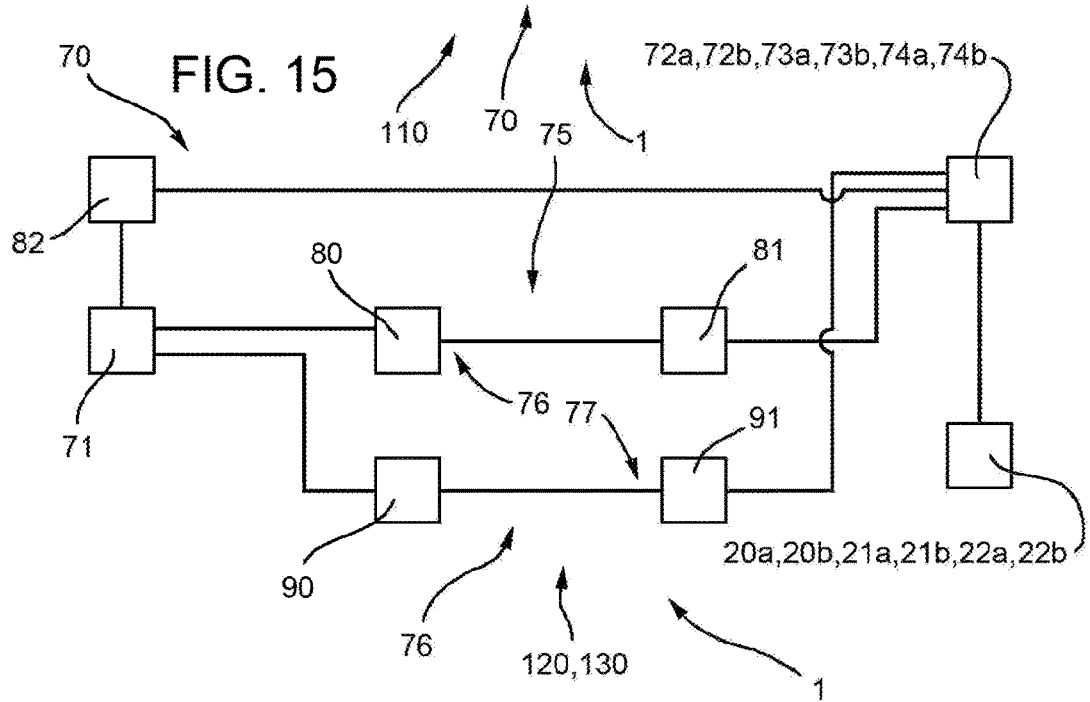
FIG. 15 schematically shows a propulsion system implemented in the second and third architecture of FIGS. 13 and 14.
Figure 13:
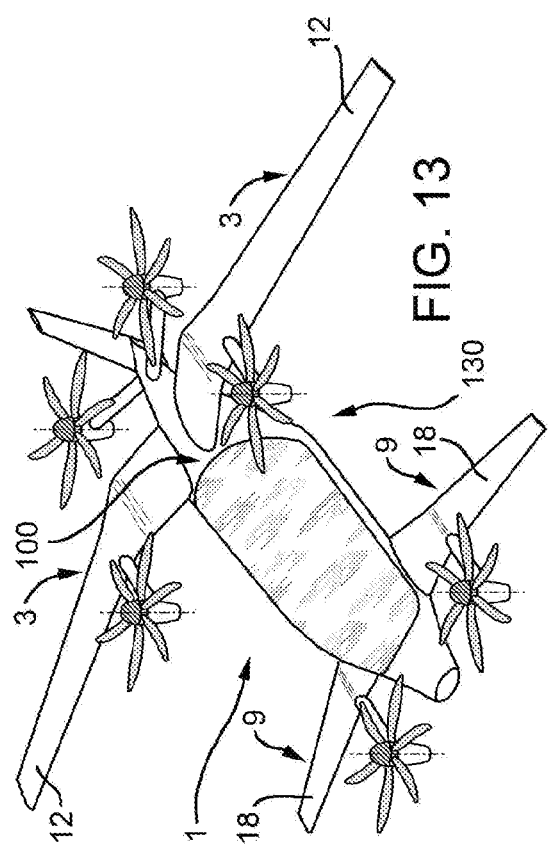
FIG. 13 shows in perspective view a third architecture of the aircraft of FIGS. 1 to 8.
Figure 12:
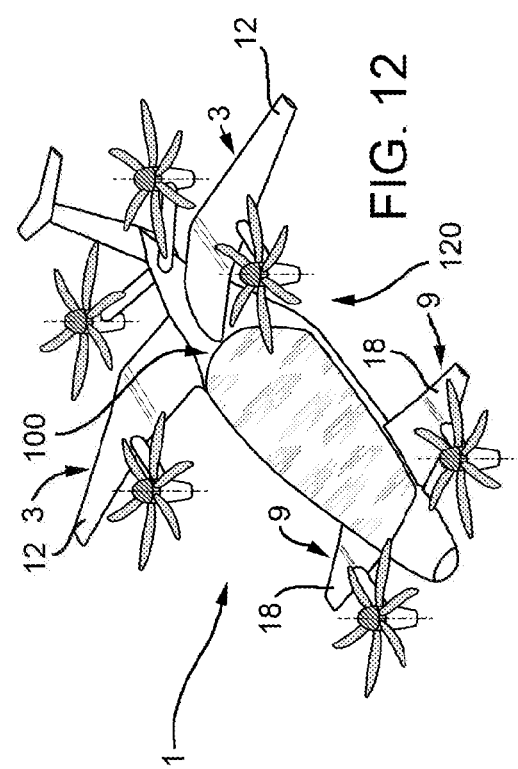
FIG. 12 shows in perspective view a second architecture of the aircraft of FIGS. 1 to 8.
Figure 19:
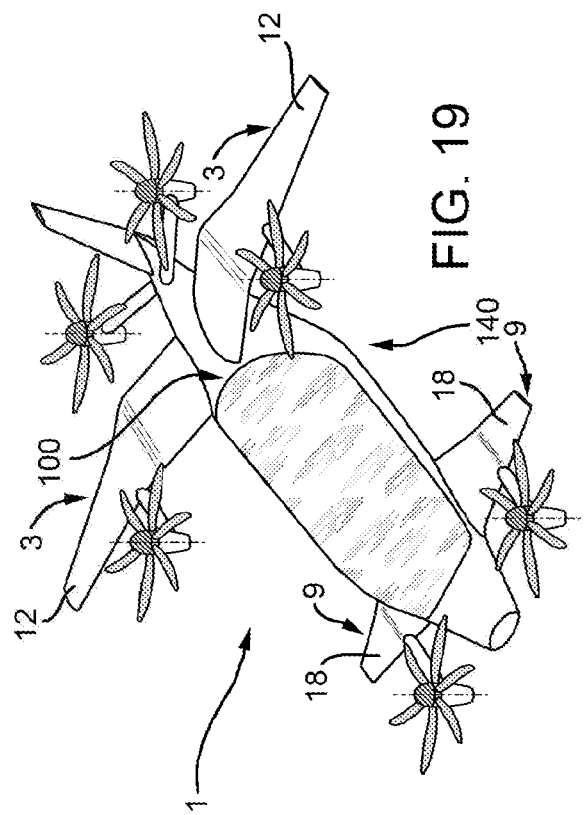
FIG. 19 shows in perspective view the fourth architecture of FIGS. 16 to 18.

With reference to FIGS. 11 and 13, the modules 120, 130 provide the aircraft 1 with the second and third architecture, respectively.

In particular, similar to the module 110, the module 120, 130 defines the compartment 60 for passengers and relative baggage. The compartment 60 is accessible through the aisle 64.

The module 120, 130 comprises a hybrid propulsion system 75 (FIGS. 14 and 15), which comprises the components of the system 70.

The system 75 of the modules 120, 130 comprises, in particular:

the system 70;

a first section 76; and a second section 77.

The section 76 comprises, in turn:

a heat engine 80, e.g. a Diesel engine; and a plurality of generators 81 driven by the heat engine 80 and selectively connectable with the electric motors 72a, 72b, 73a, 73b, 74a, 74b.

The section 77 comprises, in turn:

a heat engine 90; and a plurality of electric generators 91 that are driven by the heat engine 90 and selectively connectable with the electric motors 72a, 72b, 73a, 73b, 74a, 74b.

In particular, the heat engine 90 has a maximum power that is greater than the heat engine 80.

Similarly, the generators 91 have a maximum power that is greater than the generators 82.

Preferably, when the aircraft 1 is in the first configuration for a short time interval and the rotors 20a, 20b, 21a, 21b, 22a, 22b must generate a large power for a short time interval, the control unit 71 is programmed to electrically connect either the generators 91 or the batteries 81 to the electric motors 72a, 72b, 73a, 73b, 74a, 74b.

When the aircraft 1 is in the first configuration for a long time interval and the rotors 20a, 20b, 21a, 21b, 22a, 22b must generate a large power for the aforesaid long time interval, the control unit 71 is programmed to electrically connect both generators 82, 91 powered by respective heat engines 80, 90 to the corresponding electric motors 72a, 72b, 73a, 73b, 74a, 74b.

When the aircraft 1 is in the second configuration, the control unit 71 is programmed to connect the heat engine 80. The heat engine 80 drives the generator 82, which electrically powers the electric motors 72a, 72b, 73a, 73b, 74a, 74b and, preferably, to recharge the batteries 81 through the generator 82.

Under emergency conditions and consequent failure of the heat engines 80, 90, the control unit 71 is programmed to electrically connect the electric batteries 81 to the electric motors 72a, 72b, 73a, 73b, 74a, 74b.

With reference to FIGS. 16 to 19, the module 140 provides the aircraft 1 with the fourth architecture, which is not part of the present invention and is shown only for illustrative purposes.

In more detail, the module 140 comprises, similarly to the module 130, the heat engines 80 and 90 and the electric generators 91, 82.

The system 75 of the module 140 is totally identical to that of the modules 120, 130.

The module 140 also defines a cargo housing compartment 60 equipped with a sliding ramp that can be folded into the compartment 60.

Alternatively, the compartment 60 houses (FIGS. 17 and 18):

a sub-module 141 occupying the entire compartment 60 for large sized payloads; or a pair of sub-modules 142 each occupying half of the volume of the compartment 60 and defining respective compactly sized payloads, e.g., additional electric batteries 85 to electrically power the rotors 20a, 20b, 21a, 21b, 22a, 22b when the aircraft 1 is in the first configuration; or a sub-module 142 and a sub-module 143 similar to the sub-module 142 but provided with a socket 144 for charging the electric batteries 81, 85 which is arranged at a belly 10 of the airframe 2.

Each module 110, 120, 130, 140 further comprises (FIGS. 9, 12, 13 and 19):

respective end portions 12 for corresponding half-wings 3; and respective end portions 18 for corresponding aerodynamic surfaces 9.

In this way, the half-wings 3 and the aerodynamic surfaces 9 are optimised according to the flight envelope that are characteristic of the first, second, third and fourth architecture.

In the following and with reference to FIG. 6a, the operation of an aircraft 1 of the series according to the invention is described.

The aircraft 1 lands and takes off arranged in the first configuration with the rotors 22a, 22b arranged in the first position wherein the relative thrusts T5, 16 are directed parallel to the axis Z (FIG. 6a).

The aircraft 1 moves forward in the second configuration with the rotors 22a, 22b arranged in the second position wherein the respective thrusts T5, T6 are arranged parallel to the axis Y.

In the first configuration, the lift required to sustain the aircraft 1 is delivered by the rotors 20a, 20b; 21a, 21b and 22a, 22b.

In order to perform a roll manoeuvre (FIG. 6b), the control unit 71 is programmed to command the rotors 20a, 20b, 21a, 21b, 22a, 22b so that the thrusts T1, T3, T5 are higher (lower) than the thrusts T2, T4, T6.

This generates three differential thrusts of concordant sign T1-T2; T3-T4 and T5-16 which generate a torque and a consequent rotation of the aircraft around the axis Y.

In order to perform a pitch manoeuvre (FIG. 6c), the control unit 71 is programmed to command the rotors 20a, 20b, 21a, 21b, 22a, 22b so that the thrusts T1, T2 are equal to each other higher (lower) than the thrusts T3, T4 equal to each other.

This generates two differential thrusts of concordant sign T1-T3 and T2-T4 which generate a torque and a consequent rotation of the aircraft around the axis X.

In order to perform a yaw manoeuvre (FIG. 6d), the control unit 71 is programmed to command the rotor 22a so that the axis F is oriented towards (opposite side of) the nose 4 and the rotor 22b so that the axis G is oriented towards (opposite side of) the tail 5.

This generates two components of the thrusts T5, T6 that are parallel to the axis Y and discordant to each other which generate a torque and a consequent rotation of the aircraft around the axis Z.

During the transition from the first to the second configuration of the aircraft, the control unit 71 is programmed to reduce the thrusts T1, T2; T3, T4 of the rotors 20a, 20b; 21a, 21b as the axes F, G of the rotors 22a, 22b progressively approach a condition of parallelism with the axis Y and the speed of the aircraft 1 increases.

In the second configuration shown in FIG. 6e, the lift required to sustain the aircraft 1 is mostly provided by the half-wings 3. The rotors 20a, 20b; 21a, 21b can be optionally deactivated.

In more detail, the thrusts T1, T2 of the rotors 20a, 20b ensure the correct trimming of the aircraft 1—i.e. the adjustment of the overall lift/downforce value based on the required speed and weight conditions of the aircraft 1—while the rotors 21a, 21b are deactivated so that the thrusts T3, T4 are zero.

In order to perform a roll manoeuvre (FIG. 6f), the rotors 20a, 20b are controlled by the control unit 71 so that the thrust T1 is higher (lower) than the thrust T2.

This generates a differential thrust T1-T2, which results in a torque and a consequent rotation of the aircraft around the axis Y.

In order to perform a pitch manoeuvre (FIG. 6g), the rotors 20a, 20b, 22a, 22b are controlled by the control unit 71, so as to increase (decrease) the thrusts T1, T2 equal to each other and to adjust the thrusts T5, T6 equal to each other.

This generates a torque and a consequent rotation of the aircraft around the axis X.

In order to perform a yaw manoeuvre (FIG. 6h), the rotors 22a, 22b are controlled by the control unit 71 so that the thrust T1 is greater (lower) than the thrust T6.

This generates a torque and a consequent rotation of the aircraft around the axis Z.

When the aircraft 1 is in the second configuration, the appendages 14 may be moved with respect to the relative aerodynamic surfaces 8 in a concordant or discordant manner with each other, and thus contribute to the control of the aircraft 1.

In particular, the concordant movement of the appendages 14 results in a torque around the axis X and increases the second lift value.

Conversely, the discordant movement of the appendages 14 results in a torque around the axis Y on aircraft 1.

In the event of a failure of one or both of the rotors 20a, 20b; 22a, 22b with the aircraft 1 arranged in the second configuration (FIG. 7d), the control unit 71 rotates the rotors 22a, 22b in the respective first positions, and increases the thrusts T1, T2, T3, T4 of the rotors 20a, 20b, 21a, 21b which are optionally still operating and the thrusts, T5, 16 of the rotors, 22a, 22b (FIG. 7a).

Similarly, in the event of failure of one or both rotors 22a, 22b with the aircraft 1 arranged in the second configuration (FIG. 7e), the control unit 71 rotates the rotors 22a, 22b in the respective first positions, and increases the thrusts T1, T2, T3, T4 of the rotors 20a, 20b, 21a, 21b and the thrusts T5, 16 of the rotors 22a, 22b which are optionally still operating (FIG. 7b).

In this way, after a temporary compensation of the missing thrust T1, T5 of the rotor 20a, 22a, the aircraft 1 assumes the first configuration wherein it can land safely.

In the event of failure of the aircraft 1 in the first configuration (FIG. 7c), the control unit 71 rotates the rotors 22a, 22b in the respective second positions (FIG. 7f). In this way, the aircraft 1 can efficiently glide in order to reach a landing site.

In the first architecture (FIGS. 9 to 11) of the series according to the invention, the aircraft 1 is used for urban mobility and passenger transport applications within the compartment 60 and the module 110 is interfaced with the core 100.

The passengers and the baggage, if any, access the compartment 60 through the aisle 64 when the aircraft 1 is arranged in the first configuration.

The control unit 71 receives at input the control signals of the aircraft 1 and consequently commands the electric motors 72a, 72b, 73a, 73b, 74a, 74b so as to obtain respective desired thrusts T1, T2, T3, T4, T5, T6 from the respective rotors 20a, 20b, 21a, 21b, 22a, 22b.

The electric batteries 81 electrically power the electric motors 72a, 72b, 73a, 73b, 74a, 74b.

In the second and third architecture (FIGS. 12 to 15) of the series according to the invention, the aircraft 1 realizes a Utility category aircraft or is deployed for VIP passenger transport, and the respective modules 120, 130 are interfaced with the core 100.

In both cases, the passengers and the baggage are accommodated inside compartment 60.

When the aircraft 1 is in the first configuration for a short time interval, the heat engine 90 provides mechanical power to the generators 91.

The batteries 81 and the generators 91 electrically power the electric motors 72a, 72b, 73a, 73b, 74a, 74b, which drive the respective rotors 20a, 20b, 21a, 21b, 22a, 22b into rotation.

If the high power required by the first hovering flight configuration is required for a long time interval, both heat engines 80, 90 provide mechanical power to the respective generators 82, 91. The generators 82, 91 are in turn electrically connected to the electric motors 72*a*, 72*b*, 73*a*, 73*b*, 74*a*, 74*b* which drive the respective rotors 20*a*, 20*b*, 21*a*, 21*b*, 22*a*, 22*b* into rotation.

When the aircraft 1 transits to the second configuration wherein the power required for cruise flight is lower than that required in the first configuration, the heat engine 90 is deactivated and the heat engine 80 alone drives the electric motors 72*a*, 72*b*, 73*a*, 73*b*, 74*a*, 74*b* and recharges the batteries 81.

In the event of a failure of the heat engines 80, 90, the batteries 81 power the electric motors 72*a*, 72*b*, 73*a*, 73*b*, 74*a*, 74*b* exclusively.

In the fourth architecture (FIGS. 16 to 19) of the series according to the invention, the aircraft 1 is deployed as a remotely operated aircraft capable of carrying out long duration missions. Depending on the operational needs, either the sub-module 141, the sub-modules 142 or a sub-module 141 and a sub-module 143 are housed inside the compartment 60.

Figure 2:
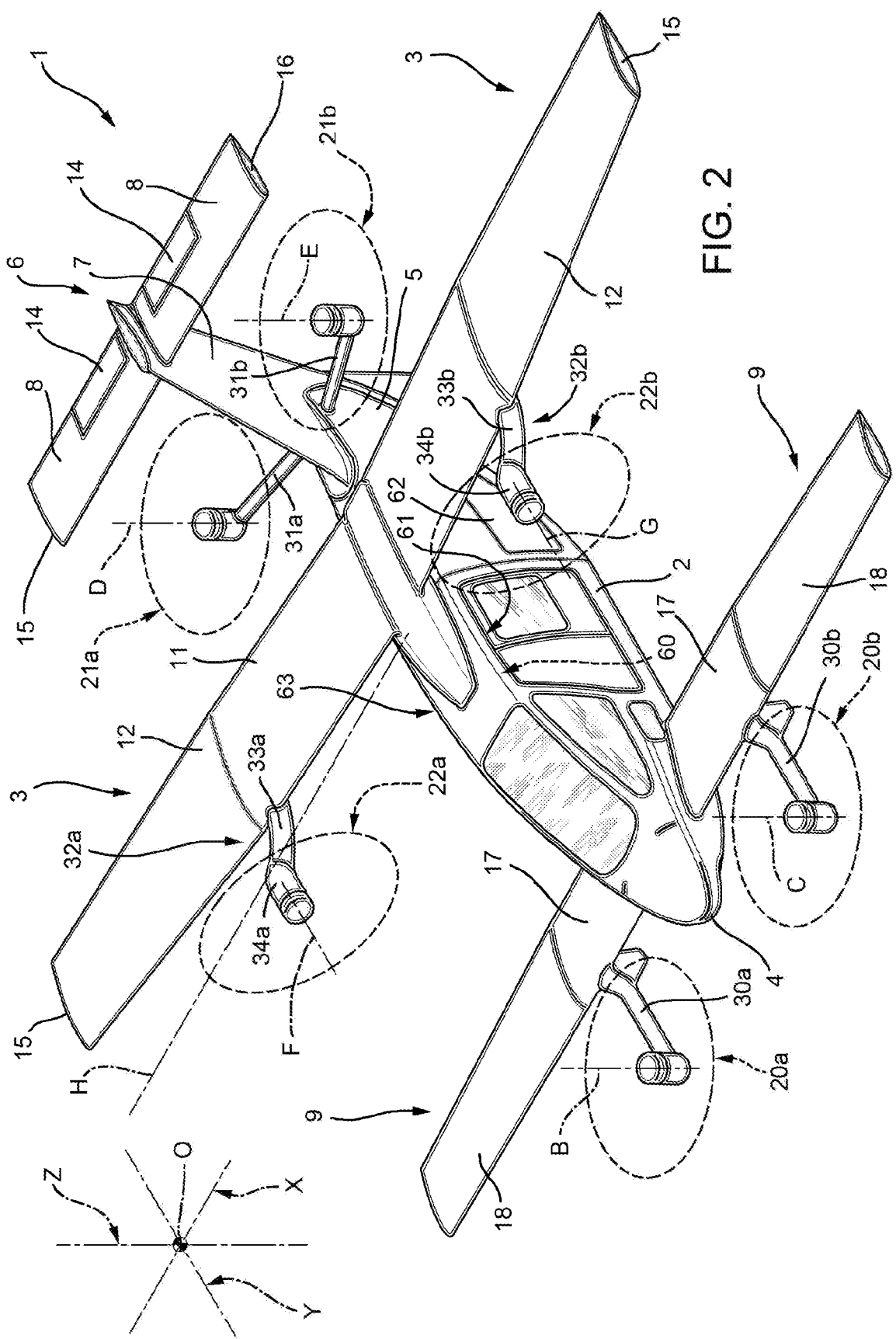
FIG. 2 is a perspective view of the aircraft of FIG. 1 arranged in a second configuration.

With reference to FIGS. 20 and 21, 1' denotes an aircraft according to a further embodiment of the invention.

The aircraft 1' is similar to the aircraft 1 and will be described below only insofar as it differs from the latter; equal or equivalent parts of the lubrication systems 1, 1' will be marked, where possible, by the same reference numbers.

In particular, the aircraft 1' differs from the aircraft 1 in that the tail portion 6' is cruciform and in that the supports 31*a*, 31*b* project cantilevered from respective sidewalls of the fin 7.

The aerodynamic surfaces 8' are arranged inferiorly to the respective rotors 21*a*, 21*b*.

The aerodynamic surfaces 8' support the respective rotors 21*a*, 21*b* and have respective fairings 13' that are movable between:
- a first position wherein the respective cords have a lying position substantially orthogonal to the axes X, Y which is assumed when the aircraft 1 is in the first configuration, so as to limit the interference with the flow of air directed downwards and generated by the rotors 21*a*, 21*b* (FIG. 21); and
- a second position wherein the respective cords have a lying position substantially orthogonal to the axes Z, X which is assumed when the aircraft 1 is in the second configuration (FIG. 20) and wherein the rotors 21*a*, 21*b* are turned off or deactivated.

The fairings 13' at least partially accommodate the respective supports 31*a*, 31*b* and are movable with respect to said supports 31*a*, 31*b* between the respective first and second position.

The aircraft 1' also differs from the aircraft 1 in that the appendages 14' are arranged on respective aerodynamic surfaces 9 instead of on respective aerodynamic surfaces 8.

The operation of the aircraft 1' differs from that of the aircraft 1 in that the fairings 13' are moved with respect to the relative aerodynamic surfaces 8' from the respective first to the respective second positions and vice versa, when the aircraft 1' transits from the second to the first configuration and vice versa.

From an examination of the characteristics of the aircraft series 1, 1' and of the method according to the present invention, the advantages it allows to be obtained are evident.

In particular, each aircraft 1, 1' of the series comprises a common core 100 and a respective module 120, 130 associated respectively with the second and third architecture and interfaced with said core 100.

In this way, it is possible to reconfigure the aircraft 1, 1' so that it is capable of carrying out different types of manned operational missions, such as those required by the urban mode deployment (first architecture), deployment as a Utility aircraft (second architecture) or deployment as a VIP category transport aircraft (third architecture).

Similarly, the aircraft 1, 1' can be easily reconfigured to be used as a remote-controlled aircraft (fourth architecture).

The core 100 further comprises the rechargeable electric power source 81 and the electric motors 72*a*, 72*b*, 73*a*, 73*b*, 74*a*, 74*b* which are operatively connected to the rotors 20*a*, 20*b*, 21*a*, 21*b*, 22*a*, 22*b*.

In this way, it is possible to use the same core 100 to make a hybrid propulsion aircraft by using modules 120, 130.

Each module 120, 130 further comprises respective end portions 12, 18 of corresponding half-wings 3 and aerodynamic surfaces 9.

In this way, each module 120, 130 optimises the aerodynamic behaviour of the first, second, third and fourth architecture of the aircraft 1, 1', based on the respective operational missions.

Clearly, changes may be made to the series of aircrafts 1, 1' and to the method as described and shown herein without, however, departing from the scope of protection defined by the claims.

In particular, the aircraft 1, 1' could comprise instead of the rotors 22*a*, 22*b*, one or more reaction or jet engines fuelled by fossil fuel, which are fixed with respect to the airframe 2, and configured to generate a thrust parallel to the axis Y under forward flight conditions.

The aircraft 1, 1' may not comprise the aerodynamic surfaces 8.

The supports 31*a*, 31*b* may project cantilevered posteriorly from respective half-wings 3 instead of from respective sidewalls 62 of the airframe 2.

The axes B, C; D, E may not be parallel to the axis Z and may be inclined with respect to the axis Z by an angle ranging between −15 and +15 degrees. In particular, the axes B, C (D, E) could converge in the axis Z above or below the airframe 2.

Some or all of the rotors 20*a*, 20*b*, 21*a*, 21*b*, 22*a*, 22*b* may have variable pitch.

Finally, the aircraft 1, 1' may comprise either the appendages 14 arranged on the aerodynamic surfaces 8, 8' or the appendages 14' arranged on the aerodynamic surfaces 9, 9'

According to this variant, the aircraft 1, 1' could perform the aforesaid pitch, yaw and roll manoeuvres, using both appendages 14, 14'. The appendages 14, 14' can be operated as required by mixing their movement with the movement of the respective aerodynamic surfaces 9, 8.

In other words, by way of example, a movement of an appendage 14 corresponds to a predetermined movement of an appendage 14' and vice versa.

The invention claimed is:

1. Series of aircrafts (1, 1') that can be converted and configured in respective mutually distinct architectures based on the operational needs of the aircrafts (1, 1'); each said aircraft (1, 1') of said series comprising:
   a core (100) that is common to all said architectures;
   said core (100) comprising:
   an airframe (2) defining a first longitudinal axis (Y) of said aircraft (1, 1');
   a first and a second rotor (20*a*, 20*b*) which are rotatable, respectively, about a second and third axis (B, C) which is fixed with respect to said airframe (2), and which are operable independently of each other so as to generate, respectively, a first and a second thrust value (T1, T2) independent of each other;

a third and a fourth rotor (21a, 21b) which are rotatable, respectively, about a fourth and fifth axis (D, E) which is fixed with respect to said airframe (2), and which are operable independently of each other so as to generate, respectively, a third and a fourth thrust value (T3, T4) independent of each other;

said second, third, fourth and fifth axis (B, C, D, E) being parallel to each other;

said second and third axis (B, C) being arranged respectively on respective sides of a first and a second sidewall (62) that are opposite to each other of said airframe (2) and symmetrically with respect to said first axis (Y);

said fourth and fifth axis (D, E) being arranged respectively on respective said sides of said first and second sidewall (62) of said airframe (2) and symmetrically with respect to said first axis (Y);

each said aircraft (1, 1') of said series further comprising:

a fifth and a sixth rotor (22a, 22b) carried by respective half-wings (3), which are rotatable respectively about a sixth and a seventh axis (F, G), and operable independently of each other so as to generate respectively a fifth and a sixth thrust value (T5, T6) independent of each other;

said sixth and seventh axis (F, G) being arranged respectively on respective said sides of said first and second sidewall (62) of said airframe (2) symmetrically with respect to said first axis (Y);

said sixth and seventh axis (F, G) being inclinable with respect to said airframe (2);

each said aircraft (1, 1') of said series being switchable between:

a first hovering or take-off/landing flight configuration wherein said sixth and seventh axis (F, G) are arranged orthogonal to said first axis (Y); and a second forward flight configuration wherein said sixth and seventh axis (F, G) are arranged parallel to or inclined with respect to said first axis (Y);

said core (100) of each aircraft (1, 1') of said series further comprising:

a rechargeable electric power source (81);

a plurality of electric motors (72a, 72b, 73a, 73b, 74a, 74b) and operatively connected to said first, second, third, fourth, fifth and sixth rotor (20a, 20b, 21a, 21b, 22a, 22b);

each said aircraft (1, 1') of said series comprising a respective module (120, 130) associated with a respective said architecture and interfaced with said core (100);

characterized in that said module (120, 130) defines a hybrid propulsion system (74);

said module (120, 130) comprising:

a control unit (71);

a first heat engine (80) configured to generate a first mechanical power value;

a second heat engine (90) configured to generate a second mechanical power value greater than said first mechanical power value;

first electric generators (82) configured to generate a first electric power value, which are electrically selectively connected to said electric motors (72a, 72b, 73a, 73b, 74a, 74b) and operable by said first heat engine (80); and second electric generators (91) configured to generate a second electric power value greater than said first value and electrically selectively connected with said electric motors (72a, 72b, 73a, 73b, 74a, 74b) and operable by said second heat engine (80);

said control unit (71) being programmed to:

electrically connect said second electric generators (91) and said rechargeable electric power source (81) to said electric motors (72a, 72b, 73a, 73b, 74a, 74b), when said aircraft (1, 1') is arranged in said first configuration for a first time interval; and electrically connect said second and first electric generators (91, 82) and said rechargeable electric power source (81) to said electric motors (72a, 72b, 73a, 73b, 74a, 74b), when said aircraft (1, 1') is arranged in said first configuration for a second time interval greater than said first time interval;

said control unit (71) being programmed to connect said first engine (80) alone to said electric generators (82) and/or to recharge said rechargeable electric power source (81), when said aircraft (1, 1') is arranged in a second configuration for a second time interval greater than said first time interval;

said control unit (71) being programmed to electrically connect said rechargeable electric power source (81) to said electric motors (72a, 72b, 73a, 73b, 74a, 74b) in case of failure of one of said first and second heat engine (80, 90).

2. Series according to claim 1, characterized in that said core (100) further comprises:

a pair of first portions (11) of respective half-wings (3) which are arranged on respective said first and second sidewall (62) that are opposite to each other of said airframe (2) and generating, in use, a first lift or downforce value; and a pair of second portions (17) of respective aerodynamic surfaces (9) arranged on respective said first and second sidewall (62) and generating, in use, a second lift/downforce value;

each said module (120, 130) comprising:

respective third portions (12) that are releasably connectable to respective first portions (11) of corresponding said half-wings (3); and respective fourth portions (18) that are connectable to respective second portions (17) of corresponding said aerodynamic surfaces (9).

3. Series according to claim 2, characterized in that said first and second portions (11, 17) define respective root portions of the corresponding said half-wings (3) and aerodynamic surfaces (9) projecting cantilevered from respective sidewalls (62) of said airframe (2);

said third and fourth portions (12, 18) defining respective free ends (15, 19) of the corresponding said half-wings (3) and aerodynamic surfaces (9), and being arranged on the opposite side of the respective said first and second portions (11, 17) with respect to said airframe, proceeding according to corresponding directions of extension of said half-wings (3).

4. Series according to claim 2, characterized in that said aerodynamic surfaces (9) of each said aircraft (1, 1') are arranged in front of said half-wings (3), with reference to a normal flight position of said aircraft (1, 1') arranged, in use, in said second configuration.

5. Series according to claim 1, characterized in that said core (100) comprises:

a fin (7) which is arranged at a tail (6) of said airframe (2); and a pair of third aerodynamic surfaces (8) projecting cantilevered from respective said first and second sidewall (62) of said fin (7) and adapted to generate, in use, a third lift/downforce value.

6. Method for configuring an aircraft (1, 1') configurable in respective mutually distinct architectures based on the operational needs of the aircraft (1, 1');
said aircraft (1, 1') comprising:
an airframe (2) defining a first longitudinal axis (Y) of said aircraft (1, 1');
a first and a second rotor (20a, 20b) which are rotatable, respectively, about a second and third axis (B, C) which is fixed with respect to said airframe (2), and which are operable independently of each other so as to generate, respectively, a first and a second thrust value (T1, T2) independent of each other;
a third and a fourth rotor (21a, 21b) which are rotatable, respectively, about a fourth and fifth axis (D, E) which is fixed with respect to said airframe (2), and which are operable independently of each other so as to generate, respectively, a third and a fourth thrust value (T3, T4) independent of each other;
said second, third, fourth and fifth axis (B, C, D, E) being parallel to each other;
said second and third axis (B, C) being arranged respectively on respective sides of a first and a second sidewall (62) that are opposite to each other of said airframe (2) symmetrically with respect to said first axis (Y);
said fourth and fifth axis (D, E) being arranged respectively on respective said sides of said first and second sidewall (62) of said airframe (2) symmetrically with respect to said first axis (Y);
said aircraft (1, 1') further comprising:
a fifth and a sixth rotor (22a, 22b) carried by respective half-wings (3), rotatable respectively about a sixth and a seventh axis (F, G) and operable independently of each other so as to generate respectively a fifth and a sixth thrust value (T5, T6) independent of each other;
said sixth and seventh axis (F, G) being arranged respectively on respective said sides of said first and second sidewall (62) of said airframe (2) symmetrically with respect to said first axis (Y);
said sixth and seventh axis (F, G) being inclinable with respect to said airframe (2);
each said aircraft (1, 1') of said series being switchable between:
a first hovering or take-off/landing flight configuration wherein said sixth and seventh axis (F, G) are arranged orthogonal to said first axis (Y); and
a second forward flight configuration wherein said sixth and seventh axis (F, G) are arranged parallel to or inclined with respect to said first axis (Y);
said method comprising the step of connecting a module (120, 130) associated with a respective said architecture of said aircraft (1, 1') to said core (100);
said core (100) comprising:
a rechargeable electric power source (81);
a plurality of electric motors (72a, 72b, 73a, 73b, 74a, 74b) and operatively connected to said first, second, third, fourth, fifth and sixth rotor (20a, 20b, 21a, 21b, 22a, 22b);
said module (120, 130) defining a hybrid propulsion system (74);
said module (120, 130) comprising:
a control unit (71);
a first heat engine (80) configured to generate a first mechanical power value;
a second heat engine (90) configured to generate a second mechanical power value greater than said first mechanical power value;
first electric generators (82) configured to generate a first electric power value, which are electrically selectively connected to said electric motors (72a, 72b, 73a, 73b, 74a, 74b) and operable by said first heat engine (80); and
second electric generators (91) configured to generate a second electric power value greater than said first value and electrically selectively connected with said electric motors (72a, 72b, 73a, 73b, 74a, 74b) and operable by said second heat engine (80);
said method being characterized by comprising the further steps of:
electrically connecting said second electric generators (91) and said rechargeable electric power source (81) to said electric motors (72a, 72b, 73a, 73b, 74a, 74b), when said aircraft (1, 1') is arranged in said first configuration for a first time interval;
electrically connecting said second and first electric generators (91, 82) and said rechargeable electric power source (81) to said electric motors (72a, 72b, 73a, 73b, 74a, 74b), when said aircraft (1, 1') is arranged in said first configuration for a second time interval greater than said first time interval;
electrically connecting said first engine (80) alone to said electric generators (82) and/or to recharge said rechargeable electric power source (81), when said aircraft (1, 1') is arranged in said second configuration for a second time interval greater than said first time interval; and
electrically connecting said rechargeable electric power source (81) to said electric motors (72a, 72b, 73a, 73b, 74a, 74b) in case of failure of one of said first and second heat engine (80, 90).

* * * * *